US012704136B2

(12) United States Patent
Ubhi et al.

(10) Patent No.: US 12,704,136 B2
(45) Date of Patent: Aug. 11, 2026

(54) TECHNOLOGIES FOR VARIABLE RETARDER CONTROL

(71) Applicant: Allison Transmission, Inc., Indianapolis, IN (US)

(72) Inventors: Upkar Ubhi, Greenwood, IN (US); Kurt Biehl, Lebanon, IN (US); Evan Meredith, Indianapolis, IN (US)

(73) Assignee: Allison Transmission, Inc., Indianapolis, IN (US)

(*) Notice: Subject to any disclaimer, the term of this patent is extended or adjusted under 35 U.S.C. 154(b) by 209 days.

(21) Appl. No.: 18/775,739

(22) Filed: Jul. 17, 2024

(65) Prior Publication Data

US 2025/0361886 A1 Nov. 27, 2025

Related U.S. Application Data

(60) Provisional application No. 63/651,377, filed on May 23, 2024.

(51) Int. Cl.
*F15B 13/04* (2006.01)
*B60T 1/087* (2006.01)
(Continued)

(52) U.S. Cl.
CPC .......... *F15B 13/0402* (2013.01); *B60T 1/087* (2013.01); *F16K 11/07* (2013.01); *F16K 11/0708* (2013.01); *F16K 27/041* (2013.01)

(58) Field of Classification Search
CPC .. F15B 13/0402; B60T 1/087; F16H 57/0435; F16H 57/0413; F16K 11/07; F16K 11/0708; F16K 27/041; F16K 27/042
See application file for complete search history.

(56) References Cited

U.S. PATENT DOCUMENTS 2,990,919 A 7/1961 Christenson et al.
3,181,677 A 5/1965 Fisher et al.
(Continued)

FOREIGN PATENT DOCUMENTS

CA 660993 A 4/1963
CA 982905 A 2/1976
EP 0631915 B1 4/1998

OTHER PUBLICATIONS

GB Search Report in copending application GB2508090.4, dated Nov. 10, 2025, 6 pages.

(Continued)

*Primary Examiner* — Kelsey E Cary
(74) *Attorney, Agent, or Firm* — Barnes & Thornburg LLP

(57) ABSTRACT

Technologies for variable retarder control include a control valve for controlling operation of a hydraulic retarder. The control valve includes a valve body having a retarder valve including multiple ports and a valve bore extending through the ports. A valve spool is located in the valve bore and movable to selectively block or connect one or more of the ports. The ports include a retarder-out port and an exhaust port, which are fluidly coupled to each other via an exhaust passageway. In use, the exhaust passageway bleeds lubrication fluid from the retarder-out port to the exhaust port as the valve spool is moved from a fully-off position to a fully-on position. The exhaust passageway is shaped so as to provide a linear relationship between the positioning of the valve spool between the fully-off and fully-on positions and the power of the hydraulic retarder. The control valve may also include a lubrication regulator valve configured to supply lubrication oil to the system while the hydraulic retarder is being bled to the exhaust port via the exhaust passageway to maintain appropriate lubrication pressures in the system.

19 Claims, 10 Drawing Sheets

(51) Int. Cl.

| | |
|---|---|
| ***F16K 11/07*** | (2006.01) |
| ***F16K 27/04*** | (2006.01) |

(56) References Cited

U.S. PATENT DOCUMENTS

| | | | |
|---|---|---|---|
| 3,524,523 | A | 8/1970 | Klimex et al. |
| 3,640,359 | A | 2/1972 | Clark et al. |
| 3,659,687 | A | 5/1972 | Edmunds |
| 3,863,739 | A | 2/1975 | Schaefer et al. |
| 3,931,870 | A | 1/1976 | Memmer |
| 3,987,874 | A | 10/1976 | Fuehrer et al. |
| 4,324,387 | A | 4/1982 | Steinhagen |
| 4,480,728 | A | 11/1984 | Bailey et al. |
| 5,000,300 | A | 3/1991 | Klemen et al. |
| 5,101,941 | A | 4/1992 | Long et al. |
| 5,456,340 | A | 10/1995 | Dadel et al. |
| 7,527,338 | B2 | 5/2009 | Long et al. |
| 9,377,066 | B2 | 6/2016 | Guillotte et al. |
| 2016/0016570 | A1 | 1/2016 | Guillotte et al. |
| 2016/0017948 | A1 | 1/2016 | Guillotte et al. |
| 2023/0059732 | A1* | 2/2023 | Kawato .................. F16K 11/07 |

OTHER PUBLICATIONS

European Search Report in copending application 25178630.7 dated Oct. 27, 2025, 10 pgs.

* cited by examiner

TECHNOLOGIES FOR VARIABLE RETARDER CONTROL

The present application claims priority under 35 U.S.C. § 119 to, and the benefit of, U.S. Provisional Patent Application Ser. No. 63/651,377, entitled "TECHNOLOGIES FOR VARIABLE RETARDER CONTROL," which was filed on May 23, 2024, the entirety of which is expressly incorporated herein by reference.

FIELD OF THE DISCLOSURE

The present disclosure relates generally to hydraulic control valves and related systems and, and, more particularly, to hydraulic control valves for controlling the operation of a hydraulic or hydrodynamic retarder.

BACKGROUND

Hydraulic retarders are often used in vehicles, especially heavy-duty commercial vehicles, as a component of an automatic transmission to assist the vehicle in braking operations. The retarder is typically coupled to the input or output of the transmission and configured to convert the rotational energy of the drivetrain into heat via rotation of components located within the retarder itself to thereby assist in the slowing of the vehicle. The generated heat is carried by a lubrication oil held in the retarder, which is removed by an associated oil cooling system. The braking assistance provided by the retarder may improve the functionality and longevity of the frictional braking system of the vehicle.

Retarder control systems are utilized to control the operation of an associated hydraulic retarder and generally include a retarder valve to supply lubrication oil to and remove lubrication oil from the associated hydraulic retarder. Typical retarder valves are often controlled using an on-off control strategy. That is, a typical retarder valve may be moved to either a fully-on position or mode or a fully-off position or mode. However, such binary control strategies provide no variability in the braking power provided by the hydraulic retarder and can produce significant and abrupt braking activity.

SUMMARY

According to an aspect of the present disclosure, a control valve for controlling operation of a hydraulic retarder includes a valve body and a valve spool. The valve body includes a retarder valve having a plurality of ports and a valve bore extending through the plurality of ports. The valve spool is located in the valve bore and includes a plurality of lands. The valve spool is moveable within the valve bore to position the plurality of lands to selectively block or connect one or more ports of the plurality of ports. The plurality of ports includes a retarder-out port configured to be fluidly coupled to an output of the hydraulic retarder and an exhaust port configured to be fluidly coupled to an oil sump. The valve body includes an interior wall separating the retarder-out port and the exhaust port, and the interior wall includes an exhaust passageway that fluidly couples the retarder-out port and the exhaust port.

In some embodiments, the exhaust passageway includes an elongated slit. For example, the exhaust passageway may include a base opening, and the elongated slit may be in fluid communication with the base opening and extend away from the base opening. In such embodiments, the base opening may have an ellipsoidal shape including a major axis having a length that is greater than a width of the elongated slit.

Additionally, in some embodiments, the valve spool may be movable between a fully-off position in which retarder-out port is fluidly coupled to the exhaust port by an opening in addition to the exhaust port, a fully-on position in which the retarder-out port is disconnected from the exhaust port, and a partial-on position between the fully-off position and the fully-on position in which the retarder-out port is fluidly coupled to the exhaust port through the exhaust passageway. In such embodiments, a cross-sectional area of the exhaust passageway that fluidly couples the retarder-out port to the exhaust port may decrease as the valve spool is moved from the fully-off position to the fully-on position. Additionally, the exhaust port may be shaped to provide a linear relationship between the position of the valve spool and a power of the hydraulic retarder.

In some embodiments, the plurality of ports may further include a cooler-input configured to be fluidly coupled to an input of an oil cooler. In such embodiments, the retarder-out port may be fluidly coupled to the cooler-in port when the valve spool is moved to the fully-on position. Additionally, in some embodiments, the control valve may further include a biasing member located within the valve bore and configured to bias the valve spool to the fully-off position.

Additionally, in some embodiments, the valve body may further include a lubrication regulator valve and a regulator valve spool. The lubrication regulator valve may include a plurality of regulator ports and a regulator valve bore that extends through the plurality of regulator ports. The regulator valve spool may be located in the regulator valve bore and may include a plurality of regulator lands. Additionally, the regulator valve spool may be moveable within the regulator valve bore to position the plurality of regulator lands to selectively block or connect one or more ports of the plurality of regulator ports. The plurality of regulator ports may include a lubrication regulator-out port fluidly coupled to a lubrication regulator-in port of the plurality of ports of the retarder valve and a system lubrication-in port configured to be fluidly coupled to a system lubrication supply line. In such embodiments, the regulator spool may be moved to a position in which the lubrication regulator-out port is fluidly coupled to the system lubrication-in port when the retarder valve spool is moved to the partial-on position to provide an amount of lubrication oil to the system lubrication supply line. Additionally, in some embodiments, the retarder valve may be embodied as a manually controlled valve.

According to another aspect of the present disclosure, a method for controlling operation of a hydraulic retarder may include moving a retarder valve from a fully-off position to a fully-on position and bleeding, while the retarder valve is being moved from the fully-off position to the fully-on position, a lubrication oil from a retarder-out port of the retarder valve that is fluidly coupled to an output of the hydraulic retarder to an exhaust port of the retarder valve that is fluidly coupled to an oil sump. In some embodiments, bleeding the lubrication oil may include allowing an amount of lubrication oil to pass through an exhaust passageway that fluidly couples the retarder-out port and the exhaust port.

Additionally, in some embodiments, the exhaust passageway may include a base opening and an elongated slit in fluid communication with the base opening and extending away therefrom. In some embodiments, moving the retarder valve may include moving a valve spool of the retarder valve and bleeding the lubrication oil may include maintaining a linear relationship between a position of the valve spool and a power of the hydraulic retarder.

According to a further aspect of the present disclosure, a hydraulic retarder control system may include a hydraulic retarder, an oil sump, a retarder valve, and a valve spool. The hydraulic retarder may include an input and an output, and the oil sump may be configured to collect and store a lubrication oil. The retarder valve may be configured to control operation of the hydraulic retarder and may include a plurality of ports and a valve bore extending through the plurality of ports. The valve spool may be located in the valve bore and may include a plurality of lands. Additionally, the valve spool may be moveable within the valve bore to position the plurality of lands to selectively block or connect one or more ports of the plurality of ports. The plurality of ports may include a retarder-out port fluidly coupled to the output of the hydraulic retarder and an exhaust port fluidly coupled to the oil sump. The retarder-out port may be fluidly coupled to the exhaust port by an exhaust passageway of the retarder valve.

In some embodiments, the exhaust passageway may be shaped to provide a linear relationship between a position of the valve spool and a power of the hydraulic retarder while the retarder valve spool is moved from a fully-off position in which retarder-out port is fluidly coupled to the exhaust port by an opening in addition to the exhaust port and a fully-on position in which the retarder-out port is disconnected from the exhaust port. Additionally, in some embodiments, the valve spool may be movable between (i) a fully-off position in which retarder-out port is fluidly coupled to the exhaust port by an opening in addition to exhaust port, (ii) a fully-on position in which the retarder-out port is disconnected from the exhaust port, and (iii) a partial-on position between the fully-off position and the fully-on position in which the retarder-out port is fluidly coupled to the exhaust port through the exhaust passageway.

In some embodiments, the hydraulic retarder control system may further includes a system lubrication supply line, a lubrication regulator valve, and a regulator valve spool. The system lubrication supply line may be configured to supply an amount of lubrication oil to components of the hydraulic retarder control system. The lubrication regulator valve may have a plurality of regulator ports and a regulator valve bore extending through the plurality of regulator ports. The regulator valve spool may be located in the regulator valve bore and may include a plurality of regulator lands. In such embodiments, the regulator valve spool may be moveable within the regulator valve bore to position the plurality of regulator lands to selectively block or connect one or more ports of the plurality of regulator ports.

In some embodiments, the plurality of regulator ports may include a lubrication regulator-out port fluidly coupled to a lubrication regulator-in port of the plurality of ports of the retarder valve and a system lubrication-in port configured to be fluidly coupled to the system lubrication supply line. Additionally, in some embodiments, the regulator spool may be moved to a position in which the lubrication regulator-out port is fluidly coupled to the system lubrication-in port when the retarder valve spool is moved to the partial-on position to provide an amount of lubrication oil to the system lubrication supply line.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
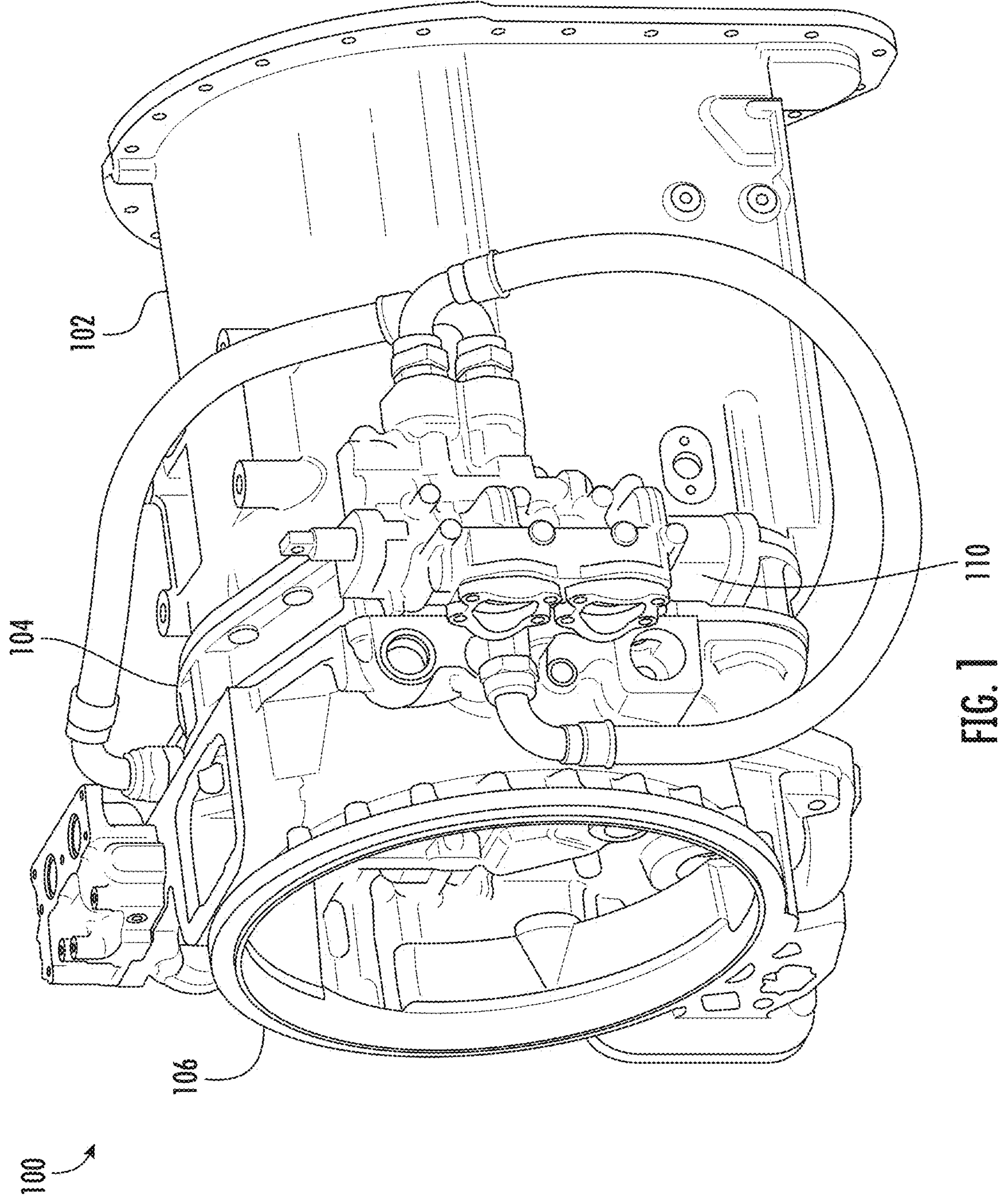
FIG. 1 is a simplified diagram of an automatic transmission assembly including a hydraulic retarder and associated system control valve assembly.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); or (A, B, and C). Similarly, items listed in the form of "at least one of A, B, or C" can mean (A); (B); (C): (A and B); (B and C); or (A, B, and C).

Some of the disclosed technologies and embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative automatic transmission assembly 100 includes an automatic transmission 102, a hydraulic retarder 104 mechanically coupled to the automatic transmission 102, a torque converter 106 mechanically coupled to the hydraulic retarder 104, and a system control valve assembly 110 fluidly coupled to various components of the assembly 100 as illustrated in and discussed in more detail below in regard to FIG. 5. In use, the system control valve assembly 110 is configured to provide variable control of the hydraulic retarder 104 by controlling the oil out flow of the hydraulic retarder 104 to thereby control the cavity pressure experienced inside the hydraulic retarder 104, which defines the present retarder power of the hydraulic retarder 104. To do so, the system control valve assembly 110 is designed to have a partial-on position or mode in which lubrication oil held in the hydraulic retarder 104 is bled to an oil sump via an exhaust passageway of the system control valve assembly 110 as discussed in more detail below. By controlling the effective cross-sectional area of the exhaust passageway, the amount of lubrication oil bled from the hydraulic retarder 104 is likewise controlled. As such, the internal pressure of the hydraulic retarder 104, and thereby the retarder power, can be reduced or increased by increasing or reducing, respectively, the effective cross-sectional area of the exhaust passageway.

It should be appreciated, however, that the bleeding of the hydraulic retarder 104 to the oil sump during the partial-on position/mode as discussed above can undesirably reduce the overall lubrication oil pressure of the assembly 100. As such, the system control valve assembly 110 is also configured to supplement or otherwise provide lubrication oil from a torque converter overage supply line (see FIG. 5) to the system lubrication supply line when the operating in the partial-on position/mode. In this way, the lubrication oil pressure of the system is maintained while variable control of the power of the hydraulic retarder 104 is provided.

Figure 2:
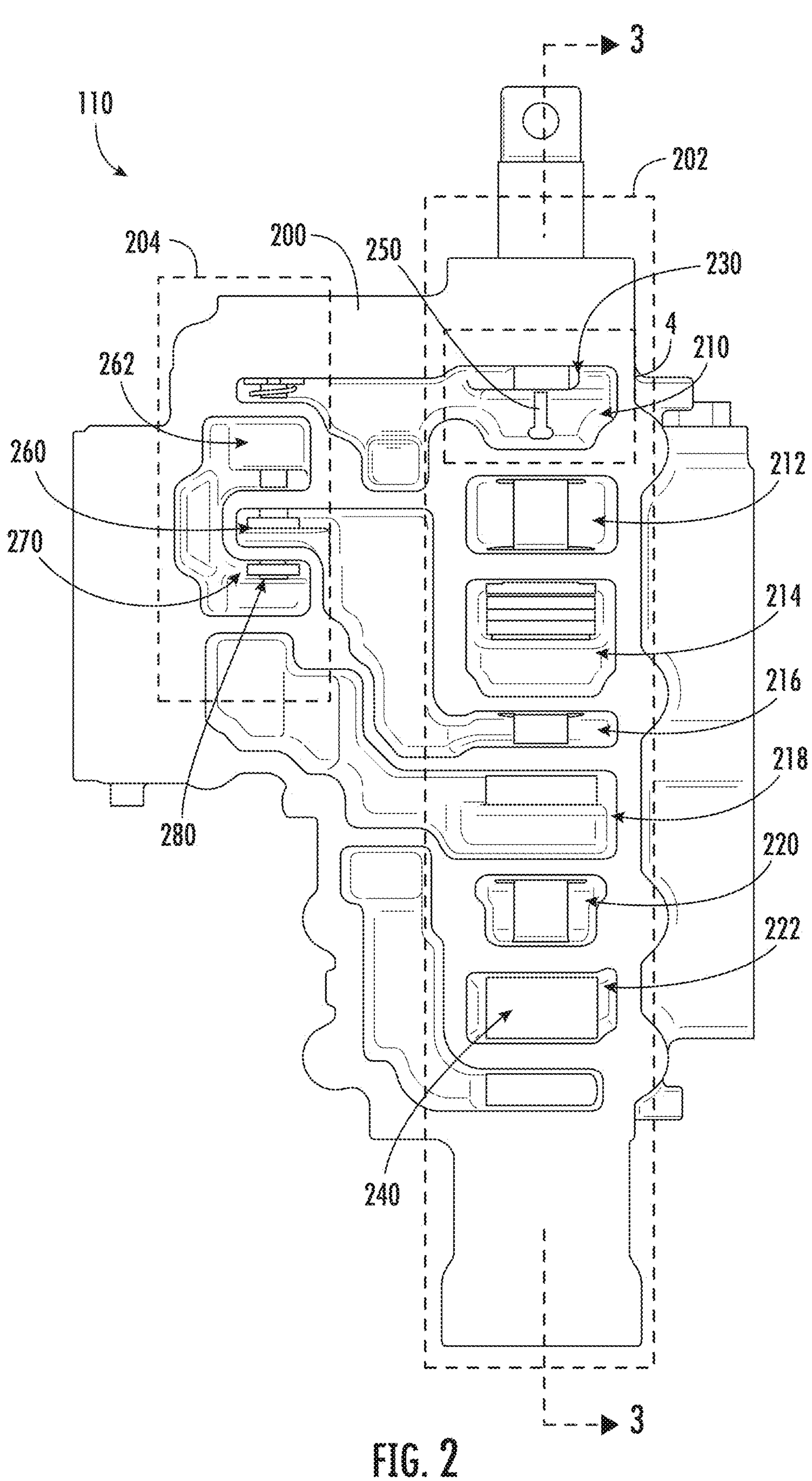
FIG. 2 is a plan elevation view of the system control valve assembly of FIG. 1 having a cover removed to visualize internal ports, valve bores, and associated valve spools of a retarder valve and a lubrication regulator valve included in the system control valve assembly.

Referring now to FIG. 2, in the illustrative embodiment, the system control valve assembly 110 includes a valve body 200 having a retarder valve 202 and a lubrication regulator valve 204. The retarder valve 202 is configured to variably control the operation of the hydraulic retarder 104, and the lubrication regulator valve 204 is configured to supplement lubrication oil to the system lubrication supply line during the partial-on position/mode of the retarder valve 202 as discussed above. Although the retarder valve 202 and the lubrication regulator valve 204 are illustrated in FIG. 2 as being combined into the system control valve assembly 110 (i.e., into the valve body 200), it should be appreciated that the valves 202, 204 may be embodied as independent valves having separate valve bodies but fluidly coupled to each other to perform the operations described herein in other embodiments.

Figure 3:
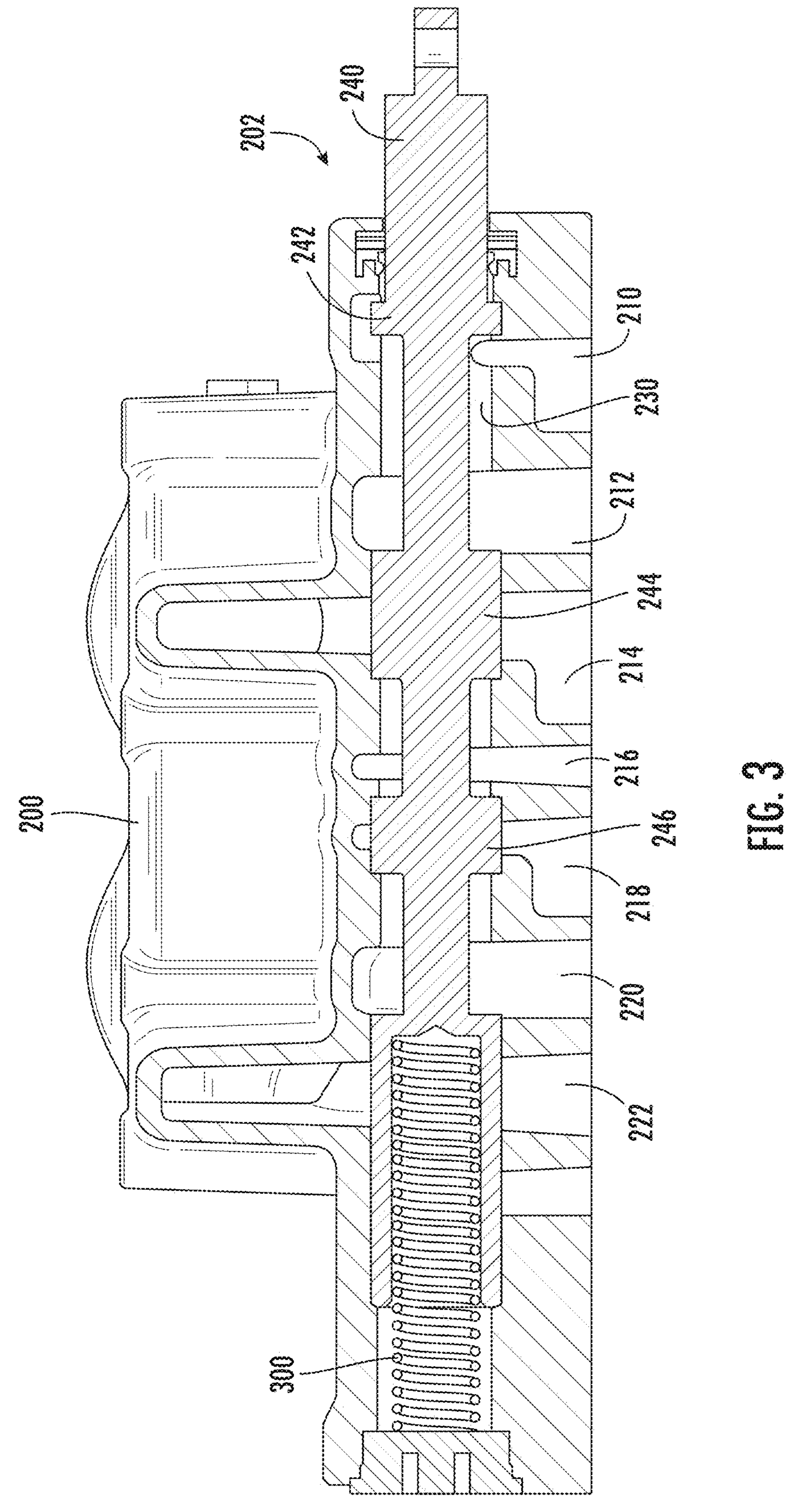
FIG. 3 is a cross-sectional view of the system control valve assembly of FIG. 2 taken generally along lines 3-3.

As shown in FIGS. 2 and 3, the retarder valve 202 is formed in the valve body 200 from multiple ports 210, 212, 214, 216, 218, 220, 222 and a valve bore 230 that extends through the ports 210, 212, 214, 216, 218, 220, 222. A retarder valve spool 240 is located in the valve bore 230 and includes multiple lands 242, 244, 246 (see FIG. 3) defined along a length of the valve spool 240. In use, the valve spool 240 is configured to slide or otherwise move within the valve bore 230 to position the lands 242, 244, 246 to selectivity block or connect one or more of the ports 210, 212, 214, 216, 218, 220, 222. As discussed in more detail below in regard to FIG. 5, each of the ports 210, 212, 214, 216, 218, 220, 222 of the retarder valve 202 may be coupled to a corresponding lubrication oil conduit of a hydraulic retarder control system 500 to facilitate the coupling of the corresponding port 210, 212, 214, 216, 218, 220, 222 to other components of the hydraulic retarder control system 500. For example, in the illustrative embodiment and as illustrated in FIG. 5, the retarder valve 202 includes an exhaust port 210 configured to be coupled to a lubrication oil sump 502, a retarder-out port 212 configured to be coupled to an output of the hydraulic retarder 104, a cooler-in port 214 configured to be coupled to an input of a lubrication oil cooler 504, a lubrication regulator port 216 configured to be coupled to a lubrication regulator-in port 260 of the lubrication regulator valve 204 (via an internal conduit), an overage-out port 218 configured to be coupled to a torque converter supply line, a retarder-in port 220 configured to be coupled to an input of the hydraulic retarder 104, and a cooler-out port 222 configured to be coupled to an output of the lubrication oil cooler 504. Of course, it should be appreciated that the retarder valve 202 may include additional ports, valve bores, valve spools, and/or other components in other embodiments.

As discussed above, the retarder valve 202 is operable to provide variable control of the power of the hydraulic retarder 104. To do so, the retarder valve spool 240 is movable from a fully-off position, through a range of partial-on positions, to a fully-on position, and visa-versa. In the fully-off position, to which the retarder valve spool 240 is biased via a biasing spring or member 300 as shown in FIG. 3, the retarder-out port 212 is fluidly coupled to the exhaust port 210 via the valve bore 230 to thereby remove lubrication from the hydraulic retarder 104 and reduce or minimize the power of the hydraulic retarder 104. Conversely, in the fully-on position, retarder-out port 212 is disconnected from the exhaust port 210 to thereby maintain lubrication within the hydraulic retarder 104 and increase or maximize the power of the hydraulic retarder 104.

Figure 4:
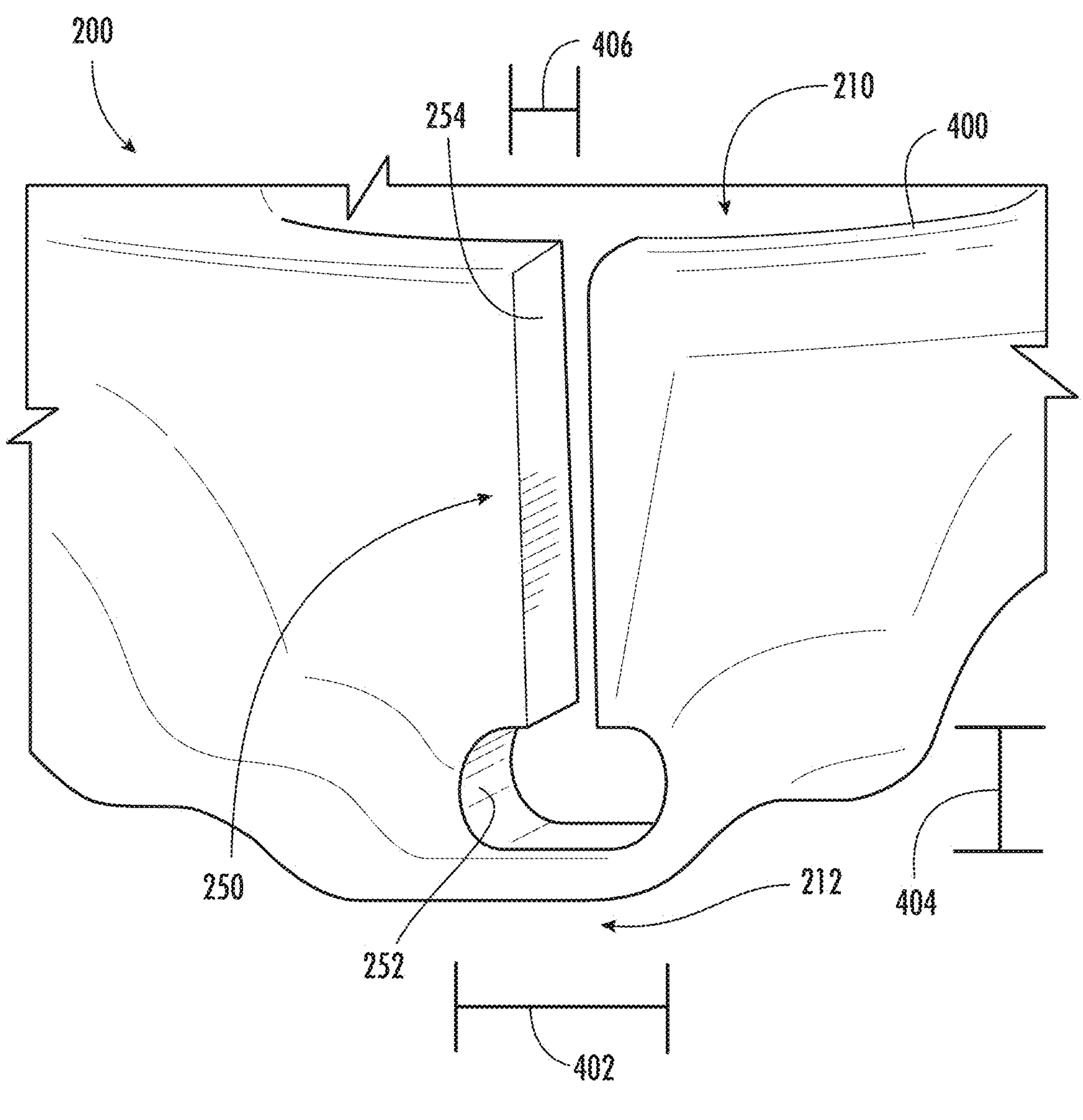
FIG. 4 is a magnified view of a retarder-out port of the retarder valve body of the system control valve assembly of FIG. 2 corresponding generally to the dashed box 4 of FIG. 2.

However, when the retarder valve 202 is moved to a partial-on position, between the fully-off and fully-on positions, the lubrication oil contained in the hydraulic retarder 104 is bled or leaked from the retarder-out port 212 to the exhaust port 210 through an exhaust passageway 250 that fluidly couples the retarder-out port 212 to the exhaust port 210. As best shown in FIG. 4, the valve body 200 includes an interior wall 400 that separates the retarder-out port 212 from the exhaust port 210. The exhaust passageway 250 is defined through the interior wall 400 to fluidly couple the retarder-out port 212 to the exhaust port 210. The illustrative exhaust passageway 250 includes a base opening 252 and an elongated slit or opening 254 in fluid communication with the base opening 252 and extending away therefrom. As such, as the retarder valve spool 240 is moved from the fully-off position toward the fully-on position, the land 242 of the valve spool 240 blocks an increasing portion of the exhaust passageway 250 thereby decreasing the effective cross-sectional area of the exhaust passageway 250, which reduces the amount of oil bled from the retarder-out port 212 to the exhaust port 210 which increases the retarder pressure hence increasing the braking power of the hydraulic retarder 104.

The exhaust passageway 250 is designed such that a linear relationship is established between the stroke position of the retarder valve 202 and the resulting power of the hydraulic retarder 104 (e.g., the pressure established within the hydraulic retarder 104). In the illustrative embodiment, the base opening 252 of the exhaust passageway 250 is ellipsoidal in shape and includes a major axis 402 (i.e., the larger of the two axes) and a minor axis 404 (i.e., the smaller of the two axes). Additionally, in the illustrative embodiment, the major axis 402 has a length that is greater than a width 406 of the elongated slit 254. It should be appreciated that by designing the major axis 402 of the base opening 252 to have a greater dimension than the width 406 of the elongated slit 254, the exhaust passageway 250 provides a linear relationship between the stroke position of the retarder valve 202 and the resulting power of the hydraulic retarder 104 when the land 242 of the valve spool 240 is covering a portion of the elongated slit 254 of the exhaust passageway 250. However, a non-linear relationship may be established when the land 242 is covering a portion of the base opening 252, relative to covering the elongated slit 254. Such relative non-linearity between the covering of the base opening 252 and the elongated slit 254 may improve the overall linear response of the stroke position of the retarder valve 202 by overcoming potential boundary layer effects of the oil passing through the exhaust passageway 250. It should be appreciated, however, the exhaust passageway 250 may have other shapes and/or dimensions in other embodiments. For example, in some embodiments the elongated slit 254 may have a width that changes along the length of the elongated slit 254 to provide a non-linear relationship between the stroke position of the retarder valve 202 and the resulting power of the hydraulic retarder 104.

Referring back to FIG. 2 and similar to the retarder valve 202, the lubrication regulator valve 204 is formed in the valve body 200 from multiple regulator ports 260, 262 and a regulator valve bore 270 that extends through the ports 260, 262. A regulator valve spool 280 is located in the regulator valve bore 270 and includes multiple lands (not shown) defined along a length of the regulator valve spool 280. In use, the regulator valve spool 280 is configured to slide or otherwise move within the regulator valve bore 270 to position the lands to selectivity block or connect one or more of the ports 260, 262. Again, as discussed in more detail below in regard to FIG. 5, each of the ports 260, 262 of the lubrication regulator valve 204 is coupled to a corresponding lubrication oil conduit of the hydraulic retarder control system 500 to thereby couple the corresponding port 260, 262 to other components of the hydraulic retarder control system 500. For example, in the illustrative embodiment and as illustrated in FIG. 2, the lubrication regulator valve 204 includes a lubrication regulator-in port 260 that is fluidly coupled to the lubrication regulator port 216 of the retarder valve 202 (via an internal conduit) and a lubrication regulator-out port 262 configured to be fluidly coupled to a system lubrication supply line 524 (see FIG. 5). Of course, it should be appreciated that the lubrication regulator valve 204 may include additional ports, valve bores, valve spools, and/or other components in other embodiments.

In use, the lubrication regulator valve 204 is configured to supply or otherwise supplement lubrication oil to the system lubrication supply line 524 when the retarder valve 202 is in the partial-on position or mode. To do so, when retarder valve 202 is in a partial-on position, the regulator valve spool 280 is moved to a position in which the lubrication regulator-in port 260 is fluidly coupled to the lubrication regulator-out port 262 to thereby supplement the lubrication oil of the system lubrication supply line 524 and maintain the lubrication oil pressure of the system.

Figure 5:
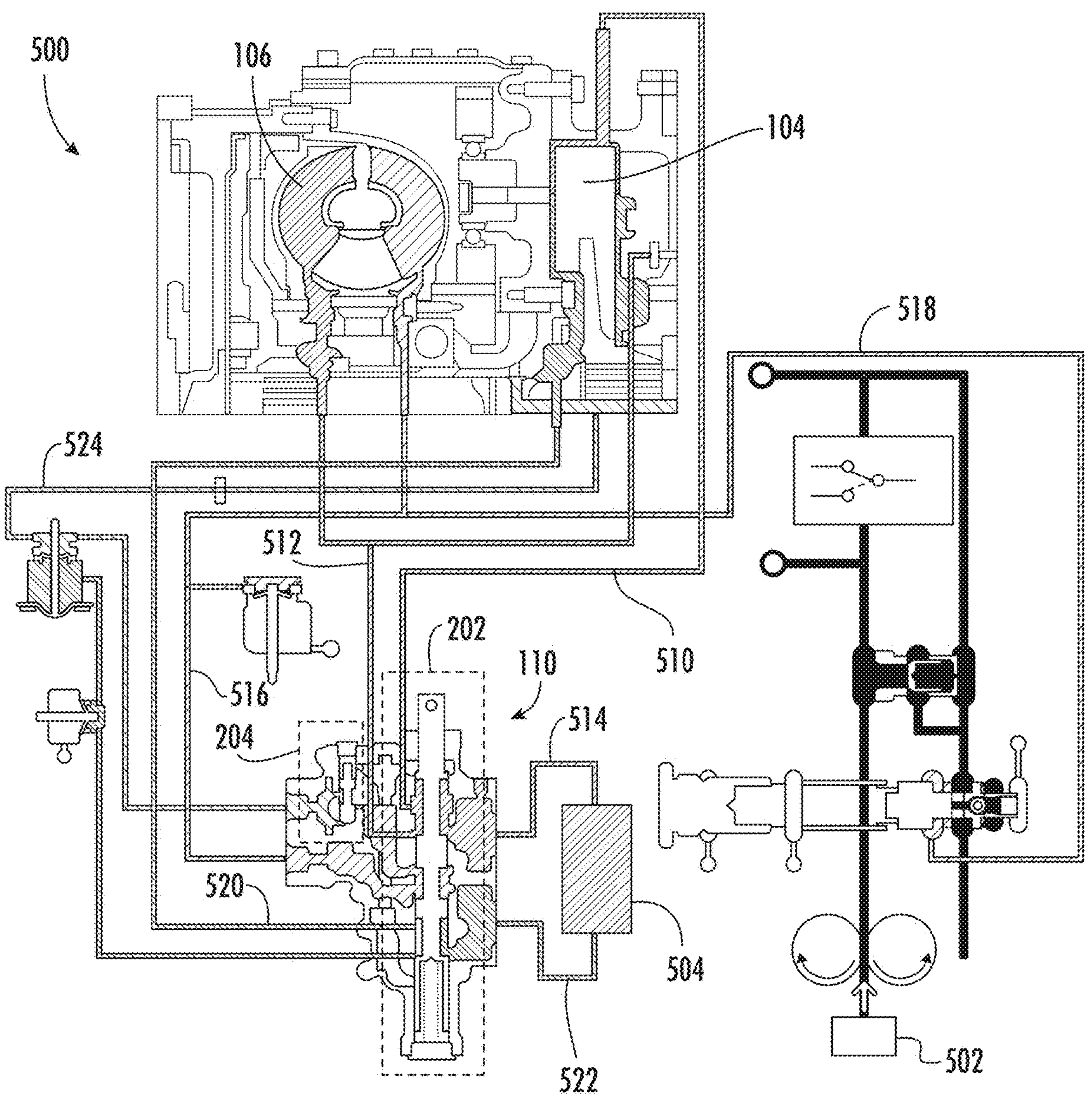
FIG. 5 is a simplified diagram of a hydraulic retarder control system that may be used to control the operation of the hydraulic retarder of FIG. 1 and including the system control valve assembly of FIG. 2.

Referring now to FIG. 5, the system control valve assembly 110 forms a component of a hydraulic retarder control system 500. The hydraulic retarder control system 500 further includes the hydraulic retarder 104, the torque converter 106, an oil sump 502, and an oil cooler 504. As discussed above, the system control valve assembly 110 is fluidly coupled to various conduits of the hydraulic retarder control system 500 to control operation of the hydraulic retarder 104. For example, the exhaust port 210 of the retarder valve 202 is coupled to the oil sump 502 via an associated exhaust conduit (not shown). Additionally, the retarder-out port 212 of the retarder valve 202 is fluidly coupled to a retarder-out conduit 510, which is fluidly coupled to an output of the hydraulic retarder 104, and to a converter-out conduit 512, which is fluidly coupled to an output of the torque converter 106. The cooler-in port 214 of the retarder valve 202 is fluidly coupled to a cooler-in conduit 514, which is fluidly coupled to an input of the oil cooler 504. The oil cooler 504 is configured to cool the lubrication oil provided by the system control valve 110.

The overage-out port 218 of the retarder valve 202 is fluidly coupled to an overage conduit 516, which is fluidly coupled to a converter supply conduit 518 that supplies lubrication oil to the torque converter 106. Additionally, the retarder-in port 220 of the retarder valve 202 is fluidly coupled to a retarder-in conduit 520, which is fluidly coupled to an input of the hydraulic retarder 104. The cooler-out port 222 of the retarder valve 202 is fluidly coupled to a cooler-out conduit 522, which is fluidly coupled to an out of the oil cooler 504. Additionally, the lubrication regulator-out port 262 of the lubrication regulator valve 204 is fluidly coupled to a system lubrication supply line 524.

Figure 6:
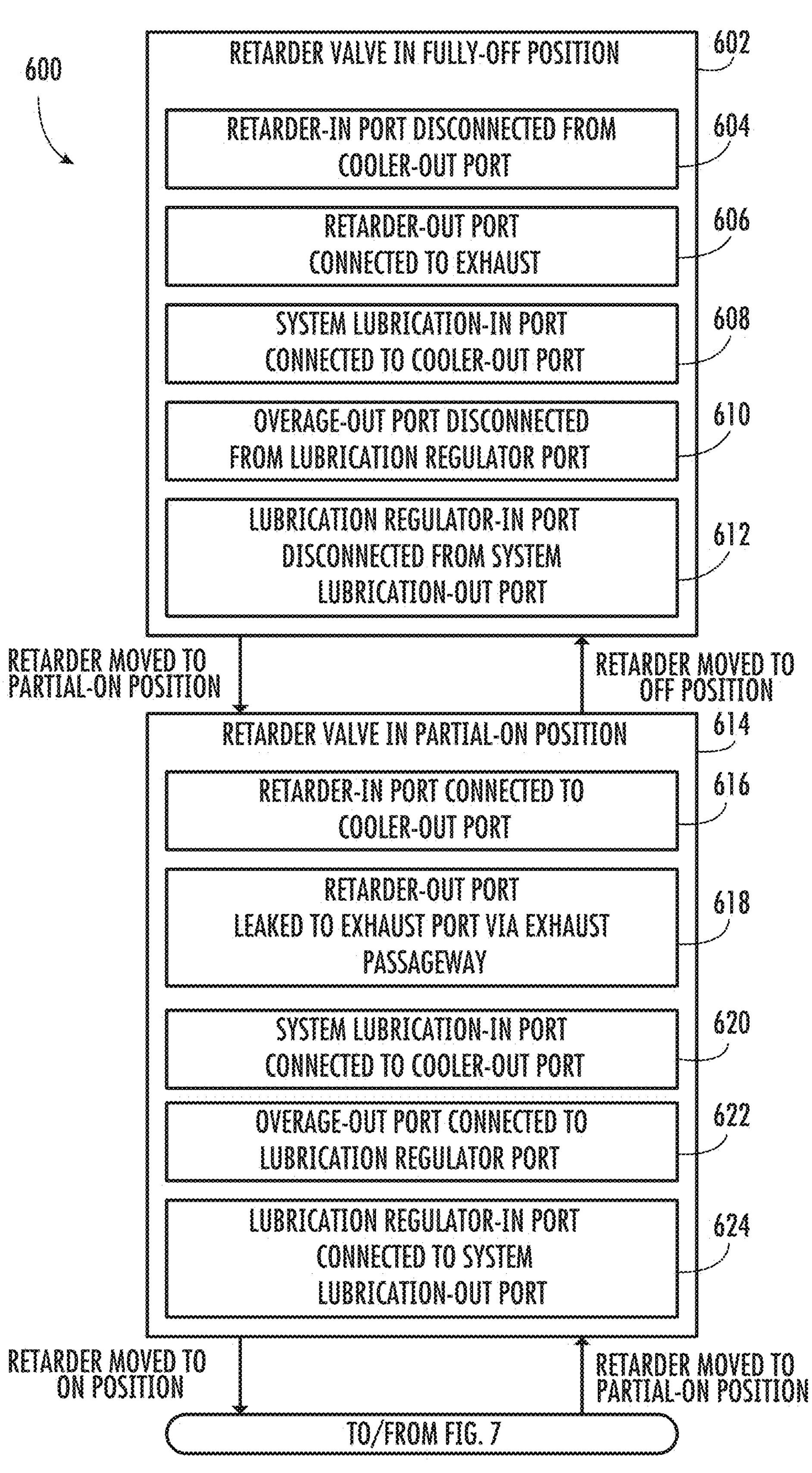
FIGS. 6 and 7 are a simplified flow diagram of a method for controlling the operation of the hydraulic retarder of FIG. 1 using the system control valve assembly of FIG. 2.
Figure 7:
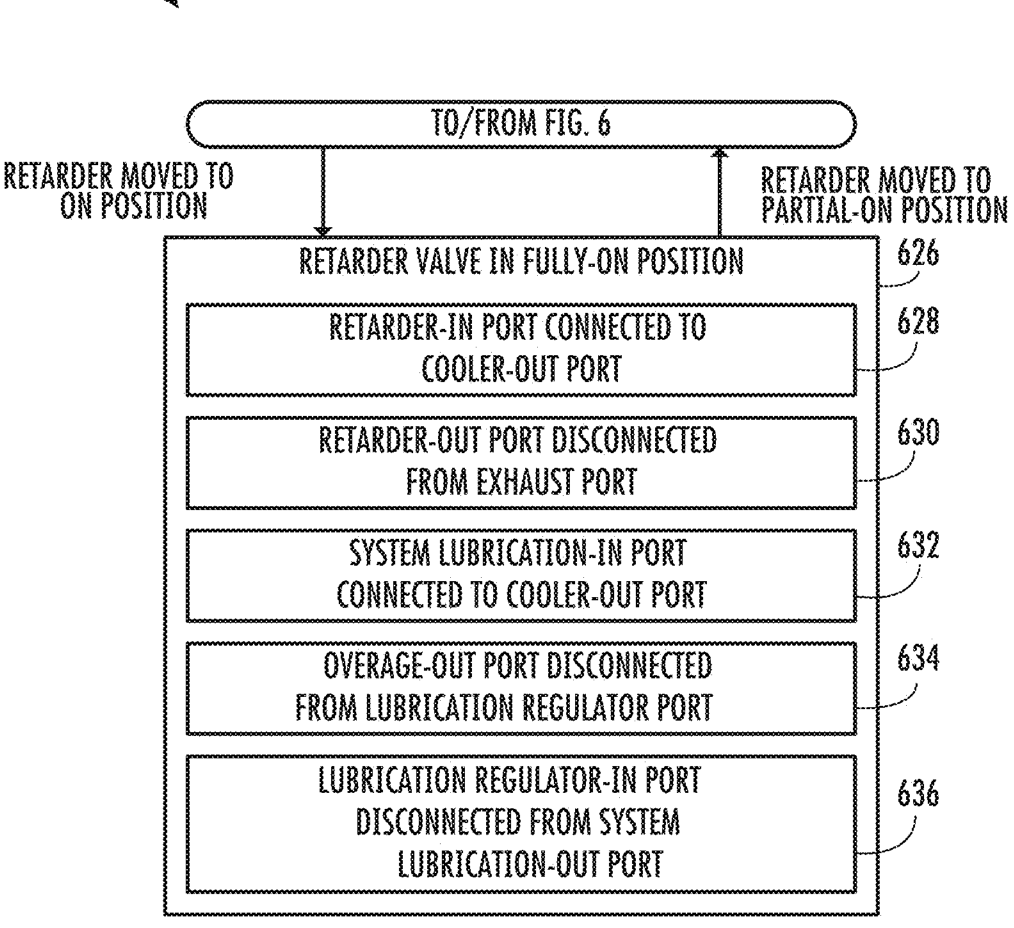
Figure 8:
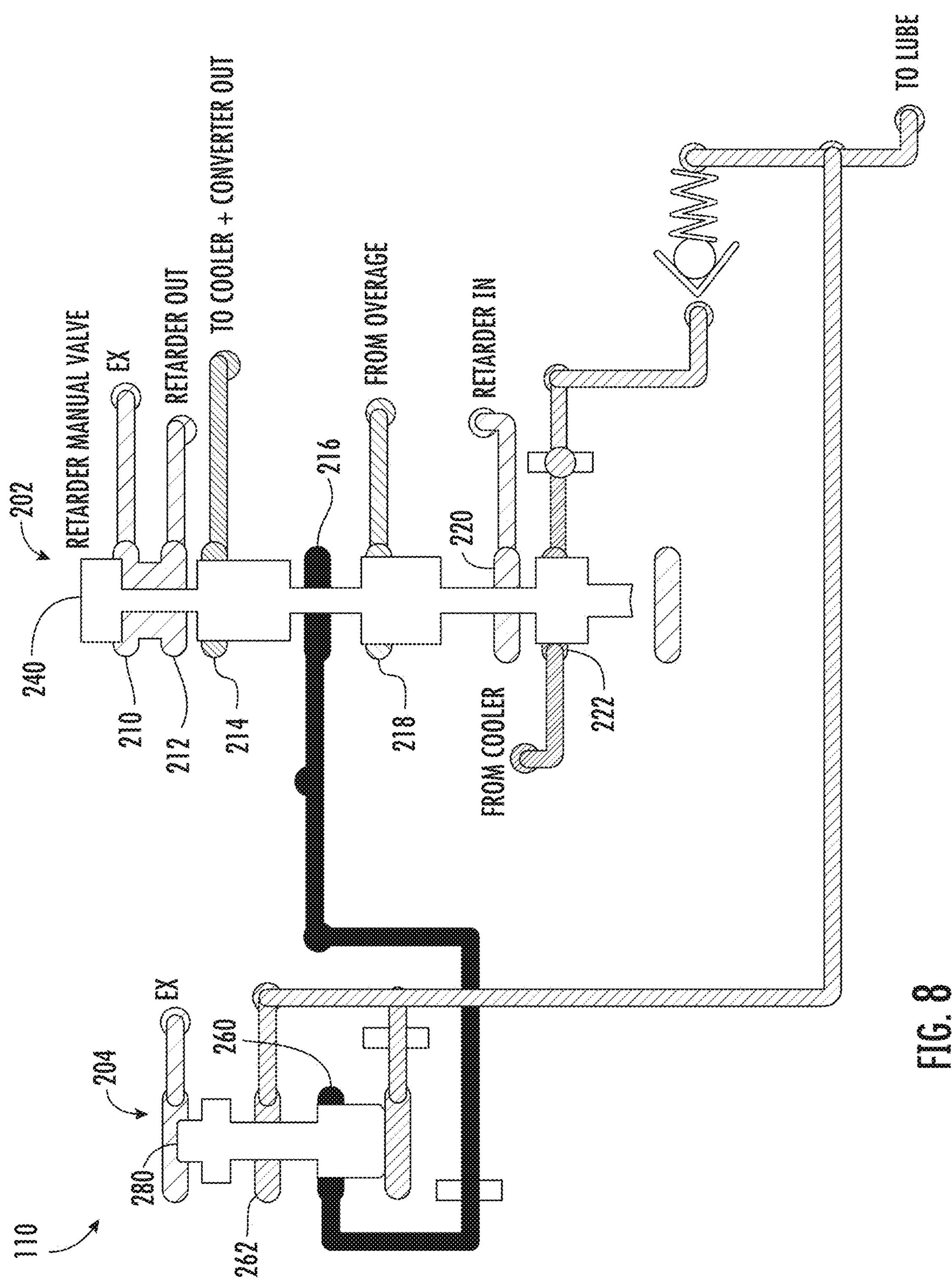
FIG. 8 is a simplified operational diagram of the system control valve assembly of FIG. 2 in a fully-off position or mode in which the retarder-out port of the retarder valve body of the system control valve assembly of FIG. 3 is fluidly coupled to an exhaust port of the retarder valve body.

Referring now to FIGS. 6 and 7, a method 600 for controlling the operation of the hydraulic retarder 104 using the system control valve assembly 110 is shown. The method 600 begins with block 602 in which retarder valve 202 of the system control valve assembly 110 is positioned in a fully-off position or mode as shown in FIG. 8. In the fully-off position/mode, the retarder-in port 220 is disconnected from the cooler-out port 222 in block 604. Additionally, the retarder-out port 212 is connected to the exhaust port 210 in block 606. The system lubrication-in port is connected to the cooler-out port 222 in block 608, and the overage-out port 218 is disconnected from the lubrication regulator port 216 of the retarder valve 202 in block 610. Additionally, in block 612, the lubrication regulator-in port 260 of the lubrication regulator valve 204 is disconnected from the lubrication regulator-out port 262 of the lubrication regulator valve 204. As such, in the fully-off position/mode, the lubrication oil of the hydraulic retarder 104 is drained to the exhaust port 210 and no supplemental lubrication oil is supplied to the system lubrication supply line 524 by the lubrication regulator valve 204.

Figure 9:
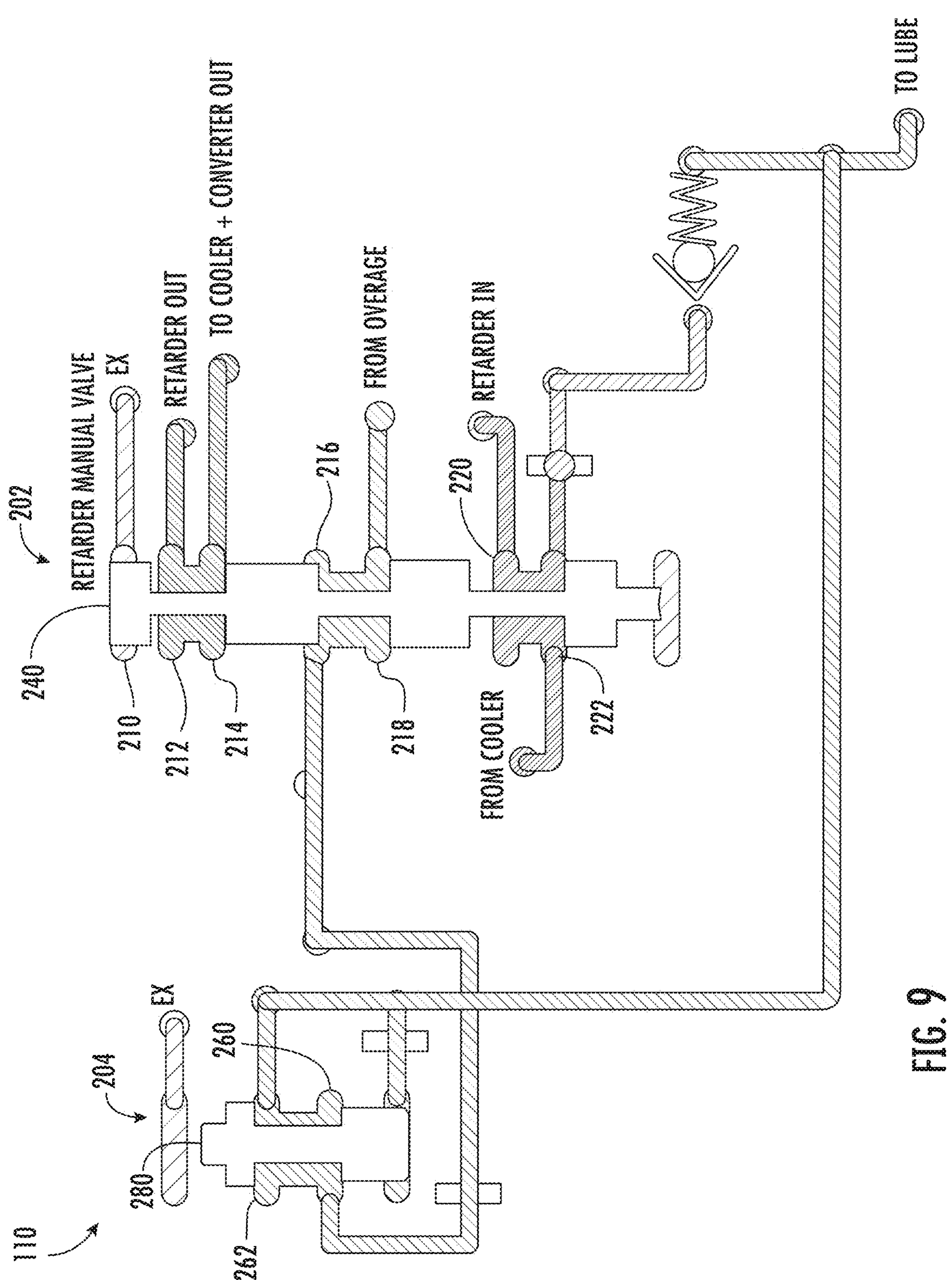
FIG. 9 is a simplified operational diagram of the retarder control valve body of FIG. 3 in a partial-on position or mode in which the retarder-out port of the retarder valve of the system control valve of FIG. 3 is bled or leaked to the exhaust port of the retarder valve.
Figure 10:
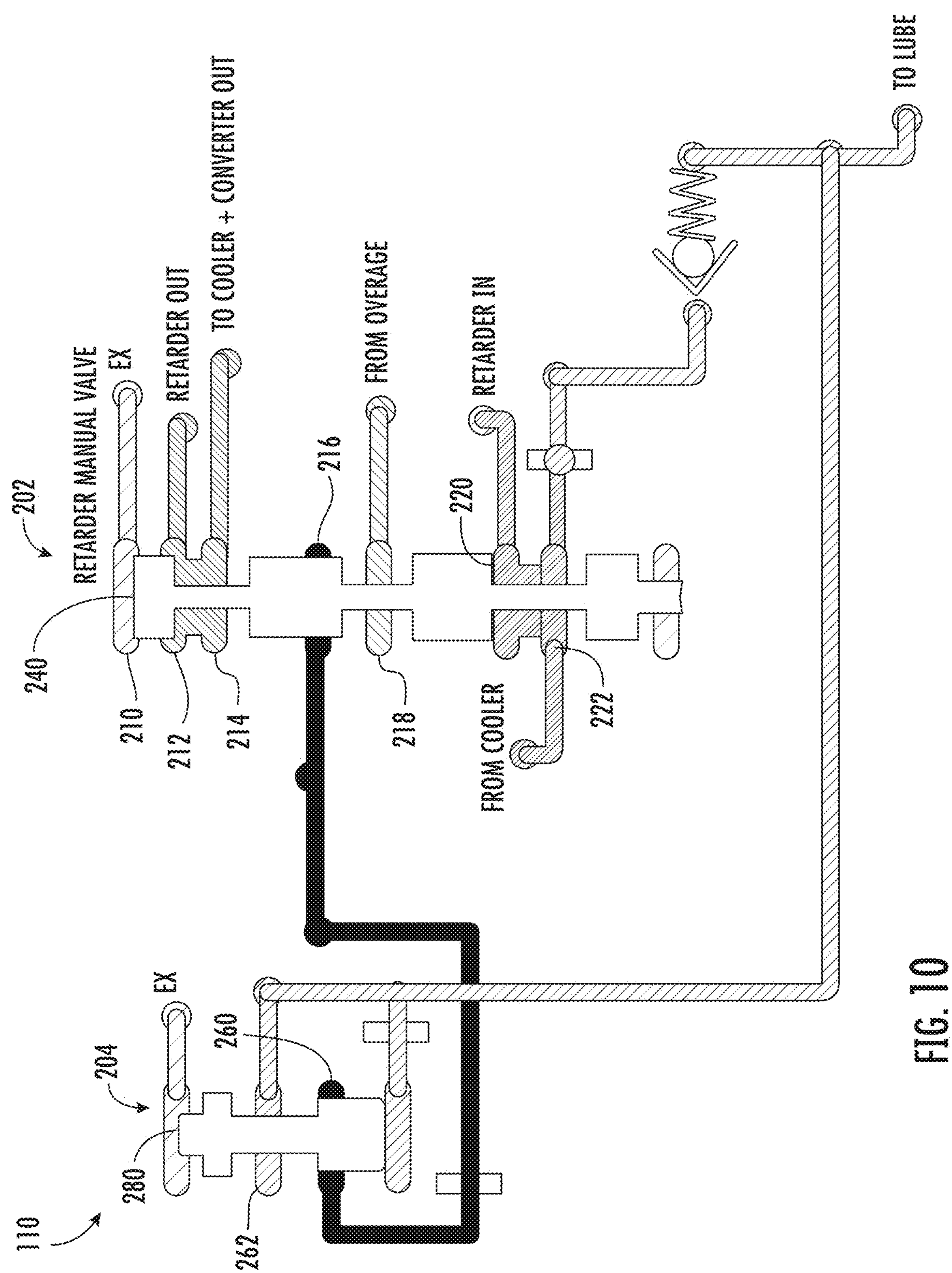
FIG. 10 is a simplified operational diagram of the retarder control valve body of FIG. 3 in a fully-off position or mode in which the retarder-out port of the retarder valve of the system control valve assembly of FIG. 3 is fluidly disconnected from the exhaust port of the retarder valve body.

Referring back to FIG. 6, as the retarder valve 202 is moved from the fully-off position/mode to the fully-on position/mode, the retarder valve is moved through various partial-on positions/modes in block 614 as shown in FIG. 9. In the partial-on position/mode, the retarder-in port 220 is connected to the cooler-out port 222 in block 616. Additionally, the retarder-out port 212 is bled or leaked to the exhaust port 210 via the exhaust passageway 250 in block 618. The system lubrication-in port is connected to the cooler-out port 222 in block 620, and the overage-out port 218 is connected to the lubrication regulator port 216 of the retarder valve 202 in block 622. Additionally, in block 624, the lubrication regulator-in port 260 of the lubrication regulator valve 204 is connected to the lubrication regulator-out port 262 of the lubrication regulator valve 204. As such, in each partial-on position/mode, the lubrication oil of the hydraulic retarder 104 is bled to the exhaust port 210 through the exhaust passageway 250 and a supplemental amount of lubrication oil is supplied to the system lubrication supply line 524 by the lubrication regulator valve 204. As discussed above, the amount of lubrication oil bled from the hydraulic retarder 104 to the exhaust port 210 is dependent on the effective cross-sectionals area of the exhaust passageway 250, which is dependent on the stroke position of the retarder valve spool 240.

Referring now to FIG. 7, the retarder valve 202 may be fully moved through the various partial-on positions/modes to a fully-on position/mode in block 626. In the fully-on position/mode, the retarder-in port 220 is connected to the cooler-out port 222 in block 628. Additionally, the retarder-out port 212 is disconnected from the exhaust port 210 in block 630. The system lubrication-in port is connected to the cooler-out port 222 in block 632, and the overage-out port 218 is disconnected from the lubrication regulator port 216 of the retarder valve 202 in block 634. Additionally, in block 636, the lubrication regulator-in port 260 of the lubrication regulator valve 204 is disconnected from the lubrication regulator-out port 262 of the lubrication regulator valve 204. As such, in the fully-on position/mode, the lubrication oil of the hydraulic retarder 104 is maintained in hydraulic retarder 104 and no supplemental lubrication oil is supplied to the system lubrication supply line 524 by the lubrication regulator valve 204. The retarder valve 202 may be subsequently moved back through the partial-on positions/modes to the fully-off position/mode as desired.

While the disclosure has been illustrated and described in detail in the drawings and foregoing description, such an illustration and description is to be considered as illustrative and not restrictive in character, it being understood that only illustrative embodiments have been shown and described and that all changes and modifications that come within the spirit of the disclosure are desired to be protected.

There are a plurality of advantages of the present disclosure arising from the various features of the methods, apparatuses, and systems described herein. It will be noted that alternative embodiments of the methods, apparatuses, and systems of the present disclosure may not include all of the features described yet still benefit from at least some of the advantages of such features. Those of ordinary skill in the art may readily devise their own implementations of the methods, apparatuses, and systems that incorporate one or more of the features of the present invention and fall within the spirit and scope of the present disclosure as defined by the appended claims.

The invention claimed is:

1. A control valve for controlling operation of a hydraulic retarder, the control valve comprising:

a valve body including a retarder valve having a plurality of ports and a valve bore extending through the plurality of ports; and a valve spool located in the valve bore and including a plurality of lands, wherein the valve spool is moveable within the valve bore to position the plurality of lands to selectively block or connect one or more ports of the plurality of ports, wherein the plurality of ports includes a retarder-out port configured to be fluidly coupled to an output of the hydraulic retarder and an exhaust port configured to be fluidly coupled to an oil sump, wherein the valve body includes an interior wall separating the retarder-out port and the exhaust port and wherein the interior wall includes an exhaust passageway that fluidly couples the retarder-out port and the exhaust port.

2. The control valve of claim 1, wherein the exhaust passageway includes an elongated slit.

3. The control valve of claim 2, wherein the exhaust passageway further includes a base opening and wherein the elongated slit is in fluid communication with the base opening and extends away from the base opening.

4. The control valve of claim 3 wherein the base opening has an ellipsoidal shape including a major axis having a length that is greater than a width of the elongated slit.

5. The control valve of claim 1, wherein the valve spool is movable between (i) a fully-off position in which retarder-out port is fluidly coupled to the exhaust port by an opening in addition to the exhaust port, (ii) a fully-on position in which the retarder-out port is disconnected from the exhaust port, and (iii) a partial-on position between the fully-off position and the fully-on position in which the retarder-out port is fluidly coupled to the exhaust port through the exhaust passageway.

6. The control valve of claim 5, wherein a cross-sectional area of the exhaust passageway that fluidly couples the retarder-out port to the exhaust port decreases as the valve spool is moved from the fully-off position to the fully-on position.

7. The control valve of claim 6, wherein the exhaust port is shaped to provide a linear relationship between the position of the valve spool and a power of the hydraulic retarder.

8. The control valve of claim 5, wherein the plurality of ports further includes a cooler-input configured to be fluidly coupled to an input of an oil cooler, and wherein the retarder-out port is fluidly coupled to the cooler-in port when the valve spool is moved to the fully-on position.

9. The control valve of claim 5, further comprising a biasing member located within the valve bore and configured to bias the valve spool to the fully-off position.

10. The control valve of claim 5, wherein the valve body further includes:

a lubrication regulator valve having a plurality of regulator ports and a regulator valve bore extending through the plurality of regulator ports; and a regulator valve spool located in the regulator valve bore and including a plurality of regulator lands, wherein the regulator valve spool is moveable within the regulator valve bore to position the plurality of regulator lands to selectively block or connect one or more ports of the plurality of regulator ports, wherein the plurality of regulator ports includes a lubrication regulator-in port fluidly coupled to a lubrication regulator port of the plurality of ports of the retarder valve and a lubrication regulator-out port configured to be fluidly coupled to a system lubrication supply line.

11. The control valve of claim 10, wherein the regulator spool is moved to a position in which the lubrication regulator-in port is fluidly coupled to the lubrication regulator-out port when the retarder valve spool is moved to the partial-on position to provide an amount of lubrication oil to the system lubrication supply line.

12. The control valve of claim 1, wherein the retarder valve is a manually controlled valve.

13. A method for controlling operation of a hydraulic retarder, the method comprising:

moving a retarder valve from a fully-off position to a fully-on position; and bleeding, while the retarder valve is being moved from the fully-off position to the fully-on position, a lubrication oil from a retarder-out port of the retarder valve that is fluidly coupled to an output of the hydraulic retarder to an exhaust port of the retarder valve that is fluidly coupled to an oil sump, wherein bleeding the lubrication oil includes allowing an amount of lubrication oil to pass through an exhaust passageway that (i) is defined through an interior wall separating the retarder-out port and the exhaust port and fluidly couples the retarder-out port and the exhaust port.

14. The method of claim 13, wherein the exhaust passageway comprises a base opening and an elongated slit in fluid communication with the base opening and extending away therefrom.

15. The method of claim 13, wherein:

moving the retarder valve comprises moving a valve spool of the retarder valve, and bleeding the lubrication oil comprises maintaining a linear relationship between a position of the valve spool and a power of the hydraulic retarder.

16. A hydraulic retarder control system comprising:

a hydraulic retarder having an input and an output;

an oil sump configured to collect and store a lubrication oil;

a retarder valve configured to control operation of the hydraulic retarder, the retarder valve including a plurality of ports and a valve bore extending through the plurality of ports; and a valve spool located in the valve bore and including a plurality of lands, wherein the valve spool is moveable within the valve bore to position the plurality of lands to selectively block or connect one or more ports of the plurality of ports, wherein the plurality of ports includes a retarder-out port fluidly coupled to the output of the hydraulic retarder and an exhaust port fluidly coupled to the oil sump, wherein the retarder-out port is fluidly coupled to the exhaust port by an exhaust passageway defined through an interior wall of the retarder valve that separates the retarder-out port and the exhaust port of the retarder valve.

17. The hydraulic retarder control system of claim 16, wherein the exhaust passageway is shaped to provide a linear relationship between a position of the valve spool and a power of the hydraulic retarder while the retarder valve spool is moved from a fully-off position in which retarder-out port is fluidly coupled to the exhaust port by an opening in addition to the exhaust port and a fully-on position in which the retarder-out port is disconnected from the exhaust port.

18. The hydraulic retarder control system of claim 16, wherein the valve spool is movable between (i) a fully-off position in which retarder-out port is fluidly coupled to the exhaust port by an opening in addition to exhaust port, (ii) a fully-on position in which the retarder-out port is disconnected from the exhaust port, and (iii) a partial-on position between the fully-off position and the fully-on position in which the retarder-out port is fluidly coupled to the exhaust port through the exhaust passageway.

19. The hydraulic retarder control system of claim 18, further comprising:

a system lubrication supply line to supply an amount of lubrication oil to components of the hydraulic retarder control system;

a lubrication regulator valve having a plurality of regulator ports and a regulator valve bore extending through the plurality of regulator ports; and a regulator valve spool located in the regulator valve bore and including a plurality of regulator lands, wherein the regulator valve spool is moveable within the regulator valve bore to position the plurality of regulator lands to selectively block or connect one or more ports of the plurality of regulator ports, wherein the plurality of regulator ports includes a lubrication regulator-in port fluidly coupled to a lubrication regulator port of the plurality of ports of the retarder valve and a lubrication regulator-out port configured to be fluidly coupled to the system lubrication supply line, and wherein the regulator spool is moved to a position in which the lubrication regulator-in port is fluidly coupled to the lubrication-regulator out port when the retarder valve spool is moved to the partial-on position to provide an amount of lubrication oil to the system lubrication supply line.

* * * * *